April 5, 1955   H. F. McCLESKEY   2,705,648
TRACTOR IMPLEMENT HITCH

Filed Nov. 7, 1952   2 Sheets-Sheet 1

H. F. McCleskey
INVENTOR

BY *CA Snow &Co.*
ATTORNEYS.

April 5, 1955  H. F. McCLESKEY  2,705,648
TRACTOR IMPLEMENT HITCH
Filed Nov. 7, 1952  2 Sheets-Sheet 2
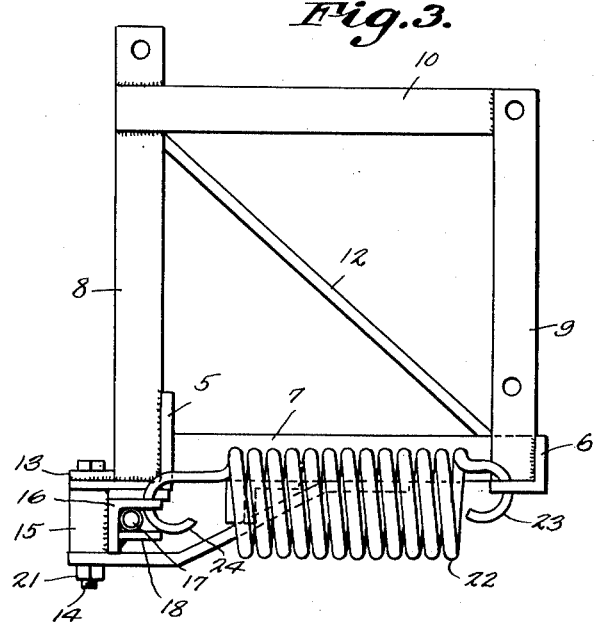
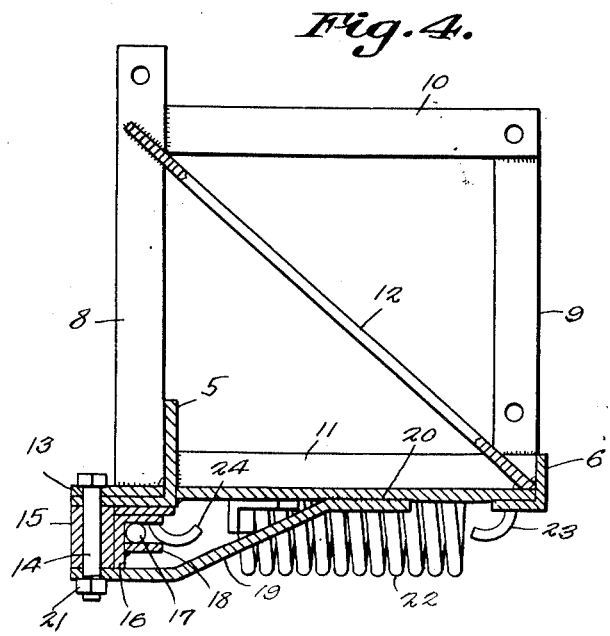
H. F. McCleskey
INVENTOR
BY Snow & Co.
ATTORNEYS.

United States Patent Office 2,705,648
Patented Apr. 5, 1955

2,705,648

TRACTOR IMPLEMENT HITCH

Henry Ford McCleskey, Marietta, Ga.

Application November 7, 1952, Serial No. 319,385

2 Claims. (Cl. 280—488)

This invention relates to an implement hitch, or draw bar for hitching agricultural implements to tractors, the primary object of the invention being to provide a hitch or draw bar having means for stabilizing the movements of the implement, and at the same time permit the tractor to make short turns without the necessity of lifting the implement towed thereby.

Another object of the invention is to provide a tractor hitch or draw bar, which will prevent locking or bucking of the agricultural implement hitched to the tractor, when making short turns.

Still another object of the invention is to include yieldable members, such as springs, in a tractor hitch, the yieldable members or springs being so constructed and arranged that they will insure the operation of the implement with a controlled movement, which is especially advantageous in making short turns.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Fig. 3 is an end elevational view of the hitch.

Fig. 4 is a sectional view taken on line 4—4 of Fig. 1.

Figure 1:
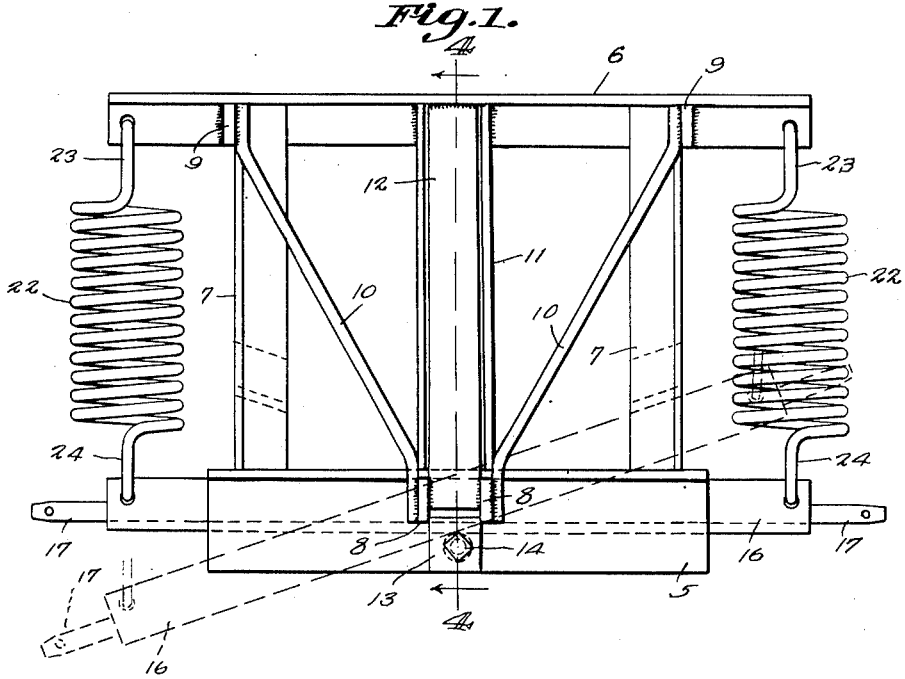
Figure 1 is a plan view of a tractor hitch, constructed in accordance with the invention.
Figure 2:
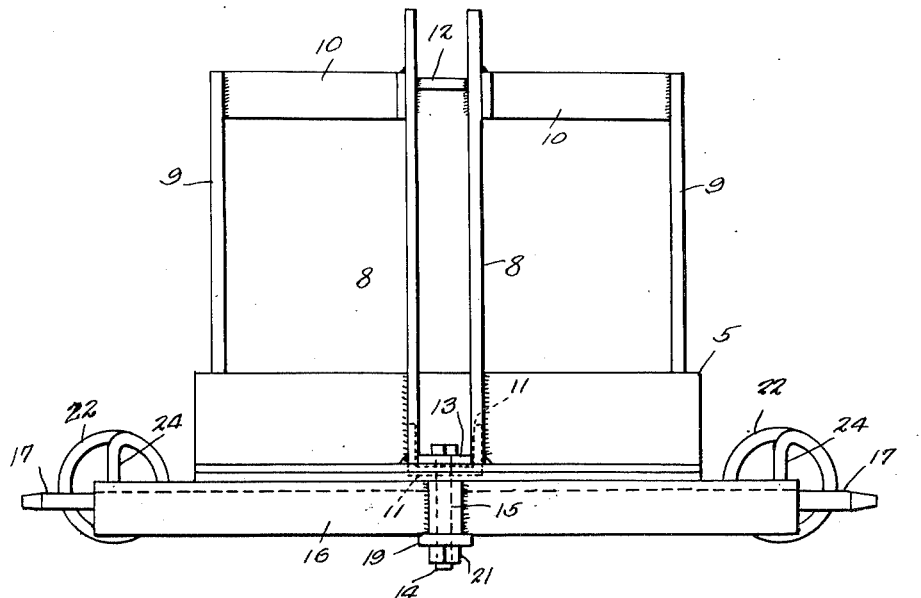
Fig. 2 is a front elevational view thereof.

Referring to the drawings in detail, the tractor hitch comprises a rectangular frame including a forward horizontal angle bar 5 and a rear horizontal angle bar 6, the bars 5 and 6 being connected near their ends by means of the horizontal end bars 7.

Rising from the forward horizontal bar 5 and disposed centrally thereof, are vertical spaced bars 8, while at the rear of the frame and connected with the rear horizontal angle bar 6, are the vertical bars 9, which are disposed adjacent to the ends of the angle bar 6.

Welded to the upper ends of the bars 9, are the brace bars 10, which extend horizontally in a forward direction, where they are welded to the bars 8. Disposed at points intermediate the ends of the forward bar 5 and rear bar 6, is a channel bar 11 which braces the tractor hitch frame at the center thereof. The reference character 12 indicates a brace bar which has its lower end welded to the channel 11, as well as to the bar 6. The other end of the brace bar 12 extends upwardly and is welded between the brace bars 8, as clearly shown by Fig. 1 of the drawings. This particular structure is one which provides an exceptionally strong and durable frame.

As shown, the forward horizontal bar 5 is substantially wide and provides a support for the horizontal plate 13 which is supported thereover. The lower section of the angle bar 5 is formed with an opening that registers with an opening formed in the plate 13, through which the pivot bolt 14 extends, the pivot bolt 14 also extending through the enlargement 15 formed intermediate the ends of the draft bar 16.

The draft bar 16 is also constructed of angle bar material with its open side disposed inwardly, providing a support for the draft rod 17, which is of a length to extend substantial distances beyond the ends of the draft bar 16. Secured under the draft bar 16 is the bar 18 which is welded to the bar 16, and this bar 18 provides the support for the draft rod 17.

In order that the strain directed to the hitch, will be dstributed throughout the central portion of the frame, the brace bar 19 is provided, which brace bar is formed with an opening to receive the lower end of the bolt 14, while the other end of the brace bar 19 is welded to the lower flanges of the channel bar 11, at 20.

A nut indicated by the reference character 21, is positioned on the threaded end of the bolt 14 securing the bolt in position.

Due to the construction shown and described, it will be seen that the draft bar and draft rod will pivot in a horizontal plane to permit the ready turning of the tractor to which an agricultural implement is hitched. In order that the movements of the draft bar and draft rod may be controlled and the rocking or bucking of the agricultural implement being towed will be prevented, coiled springs 22 are provided, the coiled springs 22 being secured to the rear horizontal angle bar 6 by passing the hooks 23 thereof through openings in said angle bars.

The hooks 24 formed at the forward ends of the springs 22 are secured to the draft bar 16, by passing them through openings in the draft bar. These springs 22 are arranged adjacent to the ends of the frame, so that they connect with the draft bar 16 at points adjacent to the outer ends thereof so that when the draft bar swings on its pivot the coiled springs 22 will act to return the draft bar to its normal operative position when the tractor making the turn, has taken a more direct path of travel and the agricultural implement towed is brought into alignment with the tractor.

Having thus described the invention, what is claimed is:

1. A tractor implement hitch embodying an upstanding frame comprising front and rear transverse horizontal bars and front and rear vertical bars, said rear transverse bar adapted to be secured to an agricultural implement, a horizontal transversely disposed draw bar comprising a length of angle bar material pivotally mounted on the front bar with its open side disposed downwardly, said draw bar being connected with said front bar immediate the ends of said draw bar, a draft rod supported on said angle bar and movable therewith, the ends of said draft rod extending substantial distances beyond the end of said angle bar, coiled springs having one of their respective ends anchored to said rear bar, the other ends of said springs being connected with the pivoted draw bar stabilizing pivotal movements of said draw bar on the front bar.

2. A tractor implement hitch embodying an upstanding frame comprising front and rear transverse horizontal bars, said rear bar adapted to be secured to an agricultural implement frame, a pair of vertical bars rising from said rear bar and a pair of vertical bars rising from said front bar, inclined brace bars connecting the pair of rear bars with the front bars at the top of the frame, a horizontal pivotal draw bar mounted on the forward transverse bar adapted to be connected to a tractor, and a yieldable stabilizing means embodying springs connected between the rear transverse bar and said draw bar adapted to bias said draw bar to an intermediate position.

References Cited in the file of this patent

UNITED STATES PATENTS

| | | |
|---|---|---|
| 2,450,566 | Schmid | Oct. 5, 1948 |
| 2,549,814 | Hume | Apr. 24, 1951 |